United States Patent Office 2,763,579
Patented Sept. 18, 1956

2,763,579

PROCESS FOR IMPREGNATING WOOD WITH AN INSECTICIDE AND THE RESULTANT PRODUCT

Wilhelm Schulenburg, Frankfurt am Main, Germany, assignor to Deutsche Gold- und Silber-Scheideanstalt vormals Roessler, Frankfurt am Main, Germany No Drawing. Application March 5, 1953,
Serial No. 340,674

8 Claims. (Cl. 117—148)

The present invention relates to the preservation of wood against attack by insects and fungi.

In many uses of wood it has been found desirable to treat the wood to prevent or delay its destruction by fungi and/or insects. For this purpose, it is customary to impregnate the wood with emulsions, suspensions or solutions of suitable protective substances, for example, tar products such as creosote and numerous salts such as zinc chloride, zinc silicofluoride, magnesium silicofluoride, and soluble thiocyanates such as ammonium or alkali metal thiocyanates. These known protective substances, however, do not in every instance meet with all of the requirements for given cases as they are very difficult or uneconomical to employ. In the case of the thiocyanates mentioned it was found that in view of their high water solubility they were quickly leached out by atmospheric influences and, furthermore, that they possess an extremely corrosive action upon any metals in contact with the wood treated therewith. Furthermore, in many instances they do not provide sufficient bactericidal or fungicidal action to meet the demands often met in practice.

It is an object of the invention to provide an effective protection of wood against bactericidal, fungicidal and attack which is not easily leached out and, furthermore, does not have substantial corrosive action upon metals.

It was unexpectedly found that soluble or solubilized thiocyanates of metals of series B of the second group of the periodic system, either singly or in combination, are excellent protective agents for the treatment of wood which are not only easy and cheap to use but also with respect to their bactericidal and fungicidal properties are at least equal and in some instances greater than those of the best previously known commercial wood protective agents, but only if these substances are used in combination with solutions of precondensed resins of formaldehyde and condensable compounds containing nitrogen. According to the invention these resin solutions may be incorporated in wood together with a thiocyanate of the metals of series B of the second group of the periodic system either simultaneously or before or after the incorporation of the thiocyanate. In any case the resin is completely condensed only within the wood whereby the inorganic thiocyanates whilst forming addition compounds or chemical compounds serve as accelerators and hardeners for the incompletely condensed resin. According to the invention the resins consist of formaldehyde or formaldehyde forming substances such as para formaldehyde on the one hand and condensable compounds containing nitrogen from the group urea, thiourea, guanidine, dicyandiamide or melamine on the other hand. In the formation of the resins salt like compounds of urea or guanidine, especially guanidine thiocyanate may be used with special advantage. In practice, I prefer to use the resin solutions and the thiocyanates of the metals of the series B of the second group of the periodic system in proportions of 0.5 to 1 part by weight of the resin solution to 1 part by weight of the solution containing the aforementioned thiocyanates.

The easily soluble zinc thiocyanates can be simply prepared by reacting zinc sulfate with potassium thiocyanate. Aqueous zinc thiocyanate solutions of a concentrate, for example, of a 2.5% or 10% can, for example, be employed for impregnating to wood sought to be protected. It is, however, not necessary to employ a previously prepared thiocyanate for the impregnation of the wood, as such thiocyanate can be formed directly on the fibre of the wood, for example, by sequential impregnation of the wood with aqueous solutions of the reactants necessary such as zinc chloride and ammonium thiocyanate. It was unexpectedly found that zinc thiocyanate, despite its high solubility in water, is leached out from wood in contact with water or moisture considerably more slowly than would be expected. Evidently, some reactions occur between the wood components and the zinc thiocyanate which effects a binding of the impregnating agent to the wood fibres. It was further found that these useful properties are not only unexpectedly increased by an addition of the aforementioned resin solutions but also because the infiltration of the completely condensed resin in the wood tends to enhance the mechanical qualities of the wood.

It is also possible, according to the invention, to convert the soluble zinc thiocyanate into an insoluble form, for example, organic complexes, so that a danger of leaching is completely avoided. For this purpose the thiocyanate can, for example, be converted into an insoluble double salt with aniline, pyridine, aminopyridine, benzophenone and the like. The production of such insoluble organic complexes can either be effected in situ in wood impregnated with the thiocyanate salt or by preforming the complex before it is incorporated in the wood. For example, wood can first be impregnated with an aqueous solution of zinc thiocyanate and then be impregnated with a 3% aqueous aniline solution whereby the difficultly soluble salt $Zn(CNS)_2.2C_6H_5NH_2$ is formed in situ on the wood fibres. As the solubility of this salt is increased at higher temperatures, the preformed complex salt can be employed for impregnation at higher temperatures employing heated vats or autoclaves. It is also possible to incorporate suspensions of the previously prepared zinc thiocyanate double salt in the wood at ordinary temperatures with the aid of vacuum. In both these cases it is expedient to first impregnate the wood with the thiocyanate solution and to incorporate the resinous solution afterwards or vice versa but in neither case at the same time. The use of the aniline double salt for the protection of wood has the further advantage that the impregnated portions of the wood are easily recognized because of the yellow coloration imparted by such salt.

While the use of zinc cations and thiocyanate anions has already been suggested for wood preservation purposes they were always employed in other combinations and without a soluble resin component. However, according to the invention it was found that a combination of these two ions with a resin is especially suitable for the preservation of wood. This may be seen from the comparisons given below in which the test samples were each impregnated with a 2.5% aqueous solution of the compound indicated and then subjected to the wood destroying fungi named.

| | Weight loss caused by— | |
|---|---|---|
| | Coniphora cerebella | Merulius domesticus |
| | Percent | Percent |
| $ZnCl_2$ | 5.02 | 7.46 |
| $NH_4CNS$ | 4.20 | 3.60 |
| $Zn(CNS)_2$ | 0.71 | 0.26 |

It was also found that an exceptionally good protective action against attack of the wood by pests can be obtained if zinc thiocyanate and resin are employed in combination with mercury compounds, preferably in the form of soluble mercury thiocyanates. It is also advantageous, according to the invention, to convert mercury compounds such as mercury chloride with thiocyanates, such as ammonium thiocyanate, and alkali metal thiocyanates into complex thiocyanates. Even zinc thiocyanates can be employed in the production of the mercury thiocyanate complex from mercuric chloride provided an excess of zinc thiocyanate is employed to effect the double decomposition so that a sufficient quantity remains for complex formation.

The use of mercuric chloride for the protection of wood is already known through the so-called "Kyanizing" process. However, in practice it was found that the mercury containing impregnating solution only has a very low penetrating action even when the wood to be treated is impregnated in autoclaves or with the aid of vacuum. Evidently, some reaction occurs between components of the wood and the mercury which prevent deeper penetration by the mercury ions. In view of the slight penetration, the protective action of the mercury compound is rather uncertain as only slight mechanical damage to the surface of the treated wood or the formation of checks during drying of the heated wood provide unprotected surfaces which are subject to attack.

Unexpectedly, it was found, according to the invention, that this difficulty is overcome by the use of complex mercury thiocyanates as with such complexes the reactions with the wood components which hinder penetration are substantially prevented and deep penetration can be obtained without deleteriously affecting the desired specific poisonous action of the mercury upon pests, especially insect pests.

The conversion of the mercury containing solution with thiocyanates is preferably carried out prior to impregnation of the wood. Such solutions combined with resins can then be employed for the impregnation of wood in any normal procedure such as, for example, painting, pasting processes, pressure processes or vacuum processes. It can, however, be advantageous in certain circumstances to carry out the impregnation in two steps in which the wood is first impregnated with thiocyanate compounds and then impregnated with a solution of a mercury compound such as mercury chloride. Substantially the same advantageous effects are obtained as when the impregnation is carried out with previously prepared mercury thiocyanate complex containing solutions. The preferred proportions of the mercury compound and the thiocyanates which are to be reacted to obtain the optimum penetration and protective action depends upon the type and condition of the wood to be treated as well as the impregnation process employed. They are, however, easily ascertained by routine tests.

While the protective agents employed, according to the invention, possess the advantage that they are substantially non-corrosive to metals and metal alloys such as iron, steel, copper, brass and the like, it may in certain instances be desirable to incorporate a rust preventative with the wood, either before, during or after impregnation with the protective agents. It is possible, of course, to add other substances for special effects, for example, flame proofing substances, dyes or other pesticides.

The following examples will serve to illustrate the invention.

*Example 1*

Pine wood blocks were saturated with an aqueous solution of zinc thiocyanate so as to contain 800 grams of zinc thiocyanate per cubic meter, according to the provisions Normblatt DW 52176 (German prescribed standards for testing wood preservatives). They are then subjected to the impregnating action of a resinous solution containing 200 grams of dicyandiamide, 147 ccm. of a 37% formaldehyde solution, 30 ccm. of a 98% glacial acetic acid and heated two hours to a temperature of about 70° to 75° C. The formed viscous mass of the precondensed resin is diluted with water and then used for the impregnation of the wood blocks. The wood blocks are then subjected to the action wood destroying fungi (*Lenzites abietina* and *Coniphora cerebella*) under biologically favorable conditions for four months. Whereas the wood blocks impregnated with zinc thiocyanate showed no attack and suffered no weight loss, the non-impregnated control blocks showed a weight loss of about 22%.

*Example 2*

Pine wood blocks are subjected to a preliminary treatment with a resin solution as described in Example 1 and then impregnated in an aqueous solution of zinc thiocyanate so that a salt take-up of 2.75 kg. of zinc thiocyanate per cubic meter of wood was effected. The impregnated wood blocks were then subjected to the stringent leaching test prescribed by Normblatt DW 52176 and to the action of the above named wood destroying fungi. It was found that even after having been subjected to such stringent leaching conditions the wood sill resisted the action of such fungi. Wood prepared in this manner is adequately resistant to leaching for use on land.

*Example 3*

A mixture of 200 grs. of urea, 50 ccm. of water and 3.4 grs. of glacial acetic acid are heated to a temperature of about 50° C. whereby 23.5 grs. of acroleine are gradually added whilst stirring. After a short increase in temperature to about 70° C. for half an hour and then cooling, 830 grs. of a 30% solution of formaldehyde are added at a temperature of 40° C. whereafter the mixture is again heated to a temperature of about 85 to 90° C. for 30 minutes. The resulting product is cooled, diluted and mixed with a 3% aqueous solution of zinc thiocyanate and then used for impregnating purposes.

*Example 4*

Pine wood was impregnated by the pressure process with a mixture of a resin solution and a solution of thiocyanate according to Example 3, subsequently dried and then impregnated with a 3% aqueous solution of aniline. The resulting zinc thiocyanate aniline complex which was formed in situ on the wood fibres gave the treated wood an easily identifiable yellow coloration and was extraordinarily resistant to leaching.

*Example 5*

Pine wood was impregnated with a mixture of one part of a 2.2% solution of zinc thiocyanate with 0.5 part of a resinous solution of the following composition: 70 parts by weight of guanidine, 70 parts by weight of thiocyanate and 70 parts by weight of melamine, 170 parts by weight of a 37% solution of formaldehyde or 68 grs. of para formaldehyde in 157 ccm. of water are mixed and stirred with 12 grs. of a 20% by weight sulfuric acid and cautiously heated until the mass becomes viscous. The wood is then impregnated with a mixture of the aforementioned resin composition and zinc thiocyanate. As soon as the resin is practically condensed in the wood, the wood is then impregnated for one hour with a 10%–15% solution of sodium arsenate and then air dried. The resulting wood was found excellent for uses in connection with water as it was found that the after treatment with sodium arsenate rendered the zinc thiocyanate substantially non-leachable. Furthermore, such after treatment increased the resistance of the wood to insecticidal attack.

*Example 6*

180 grams of mercuric thiocyanate were dissolved in 1800 ccm. of a 3.1% aqueous solution of potassium thiocyanate. The solution of the resulting mercury thiocyanate complex was found to leave good penetrating properties when employed in the treatment of wood either by the painting, pressure or vacuum processes. The thus treated wood is then subjected to an after impregnation with a resinous solution as described in Example 5.

*Example 7*

The wood block is first impregnated with a resin solution according to Example 5 and then subjected to an aftertreatment with a mixture containing 11 grams of sodium chloride added to 500 ccm. of a 5% mercuric chloride solution and a further addition of 50 ccm. of a solution of 10 grams of zinc thiocyanate in 100 ccm. of water whilst stirring. Wood impregnated with the resulting solution is protected by the combined action of resin, mercury, zinc and thiocyanate ions.

*Example 8*

Air dry wood was subjected to a pressure impregnation with a 15 to 20% aqueous potassium thiocyanate solution containing 5% of the resin according to Example 5 relative to the whole volume of the solution and subsequently before full impregnation was effected it was treated with a saturated solution of mercuric chloride.

I claim:

1. A process for rendering wood more resistant to attack by insects and fungi which comprises impregnating wood with a solution of an incompletely condensed resin obtained by condensation of at least one aldehyde selected from the group consisting of formaldehyde, paraformaldehyde and acrolein with a condensible nitrogen containing compound selected from the group consisting of urea, thiourea, guanidine, dicyandiamide and melamine and with a solution of thiocyanate of zinc.

2. A process according to claim 1 in which the wood is also impregnated with a solution of a soluble mercury thiocyanate.

3. A process according to claim 1 which in addition comprises subsequently impregnating the wood with aniline.

4. A process according to claim 1 in which the proportion of zinc thiocyanate and resin with which the wood is impregnated is 1:0.5 to 1 part by weight.

5. A process for rendering wood more resistant to attack by insects and fungi which comprises impregnating wood with a solution of an incompletely condensed resin obtained by condensation of guanidine, thiocyanate, melamine and formaldehyde in the presence of sulfuric acid and with a solution of a thiocyanate of zinc.

6. A wood product resistant to attack by fungi produced according to the process of claim 1.

7. A wood product resistant to attack by fungi produced according to the process of claim 2.

8. A wood product resistant to attack by fungi produced according to the process of claim 3.

References Cited in the file of this patent

UNITED STATES PATENTS

| 1,606,359 | Gerngross | Nov. 9, 1926 |
| 2,637,661 | Benignus | May 5, 1953 |

FOREIGN PATENTS

| 509,693 | Belgium | Mar. 31, 1952 |